United States Patent [19]

Spellmann

[11] 4,353,117
[45] Oct. 5, 1982

[54] METHOD OF DIAGNOSING ERRORS OFF-LINE IN PIPE SPECIFICATION FILES OF A COMPUTER-AIDED GRAPHICS SYSTEM

[75] Inventor: Richard A. Spellmann, El Cerrito, Calif.

[73] Assignee: Chevron Research Company, San Francisco, Calif.

[21] Appl. No.: 108,267

[22] Filed: Dec. 28, 1979

[51] Int. Cl.³ .............................................. G06F 15/56
[52] U.S. Cl. .................................... 364/300; 364/520
[58] Field of Search ............... 364/300, 200 MS File, 364/900 MS File, 119, 464, 468, 488, 518–521, 571, 560–564, 580, 737

[56] References Cited

U.S. PATENT DOCUMENTS

| | | | |
|---|---|---|---|
| 3,534,396 | 10/1970 | Hart et al. | 364/520 |
| 4,075,695 | 2/1978 | Lelke | 364/200 |
| 4,181,954 | 1/1980 | Rosenthal et al. | 364/520 |

Primary Examiner—Leo H. Boudreau
Attorney, Agent, or Firm—Edward J. Keeling; H. D. Messner

[57] ABSTRACT

A method of updating pipe specification files of a computer-dominated piping graphics system, off-line. Interactive cross-checking of new data increases likelihood of effective, later batch operations.

4 Claims, 3 Drawing Figures

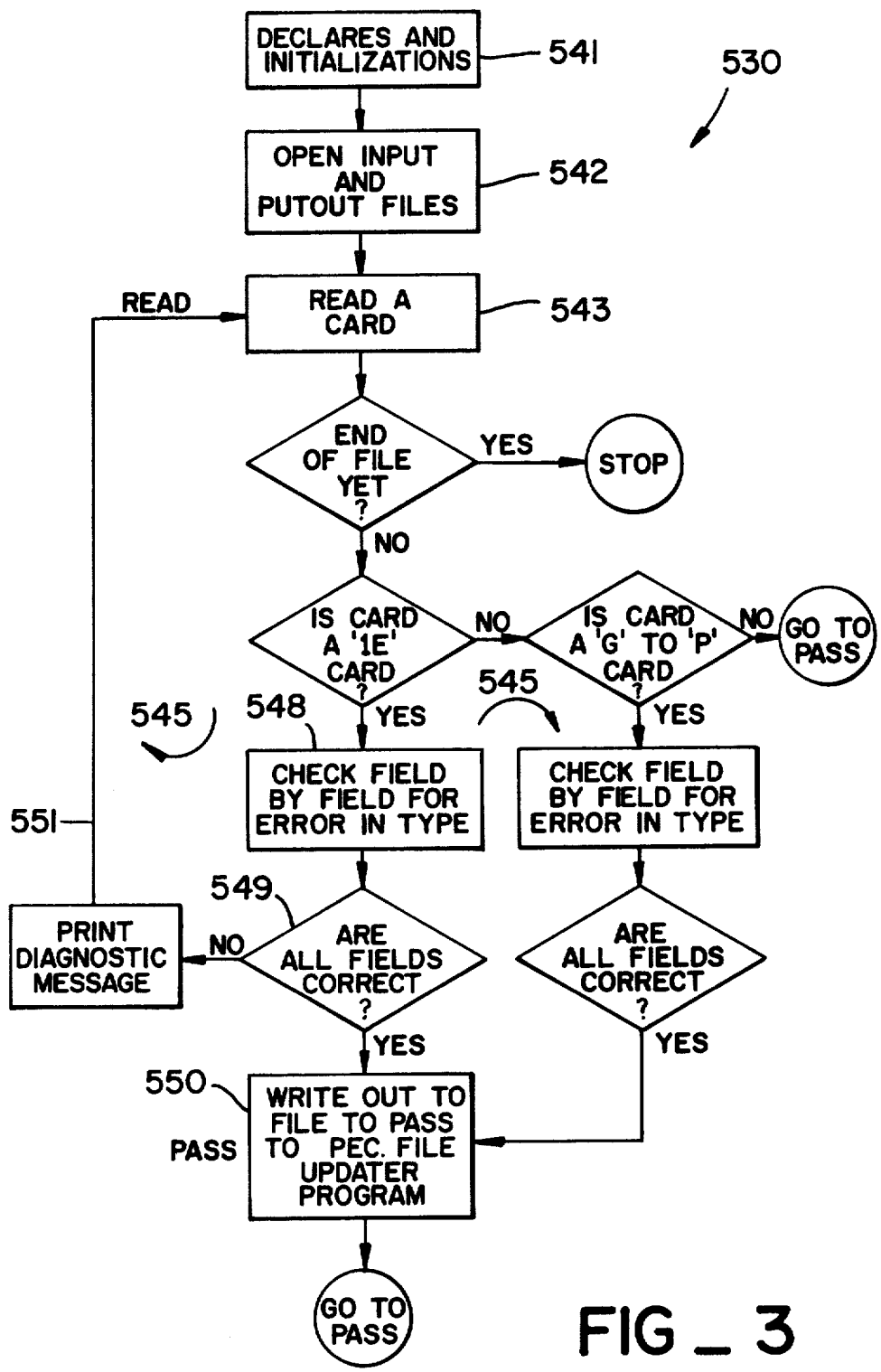
FIG_3

METHOD OF DIAGNOSING ERRORS OFF-LINE IN PIPE SPECIFICATION FILES OF A COMPUTER-AIDED GRAPHICS SYSTEM

FIELD OF THE INVENTION

This relates to an improved method of providing isometric drawings of piping systems (and generating associated bills of material), both used in construction within an oil refinery, chemical plant, and the like.

RELATED APPLICATION

The following application assigned to the assignee of the instant application is hereby incorporated by reference: Ser. No. 412,527 filed Nov. 2, 1973 for "Computer-aided Graphics System Including a Computerized Material Control System and Method of Using Same", L. Rosenthal et al., now U.S. Pat. No. 4,181,954.

BACKGROUND OF THE INVENTION

While the above-identified piping system dominates the market place related to automatic generation of isometric drawings and associated bills of materials in large-scale piping projects, improvements are always sought. E.g., during updating of piping specification files format errors due to improper key punched data can easily occur.

SUMMARY OF THE INVENTION

The present invention relates to a novel off-line programmable method by which all incoming updated field information is scanned—in a preprocessing mode—for errors before the data are allowed to enter the piping specification update program proper. Criterion: The fields must be of a correct integer, cardinal number and the like, as a function of piping specification class, before the data is allowed to pass. Otherwise, an error diagnostic message is generated, so as to allow the user to correct the designated errors.

DETAILED DESCRIPTION OF THE DRAWINGS

FIG. 3 is a flow chart of the off-line program method of FIG. 2;

DESCRIPTION OF AN EMBODIMENT OF THE PRESENT INVENTION

Figure 1:
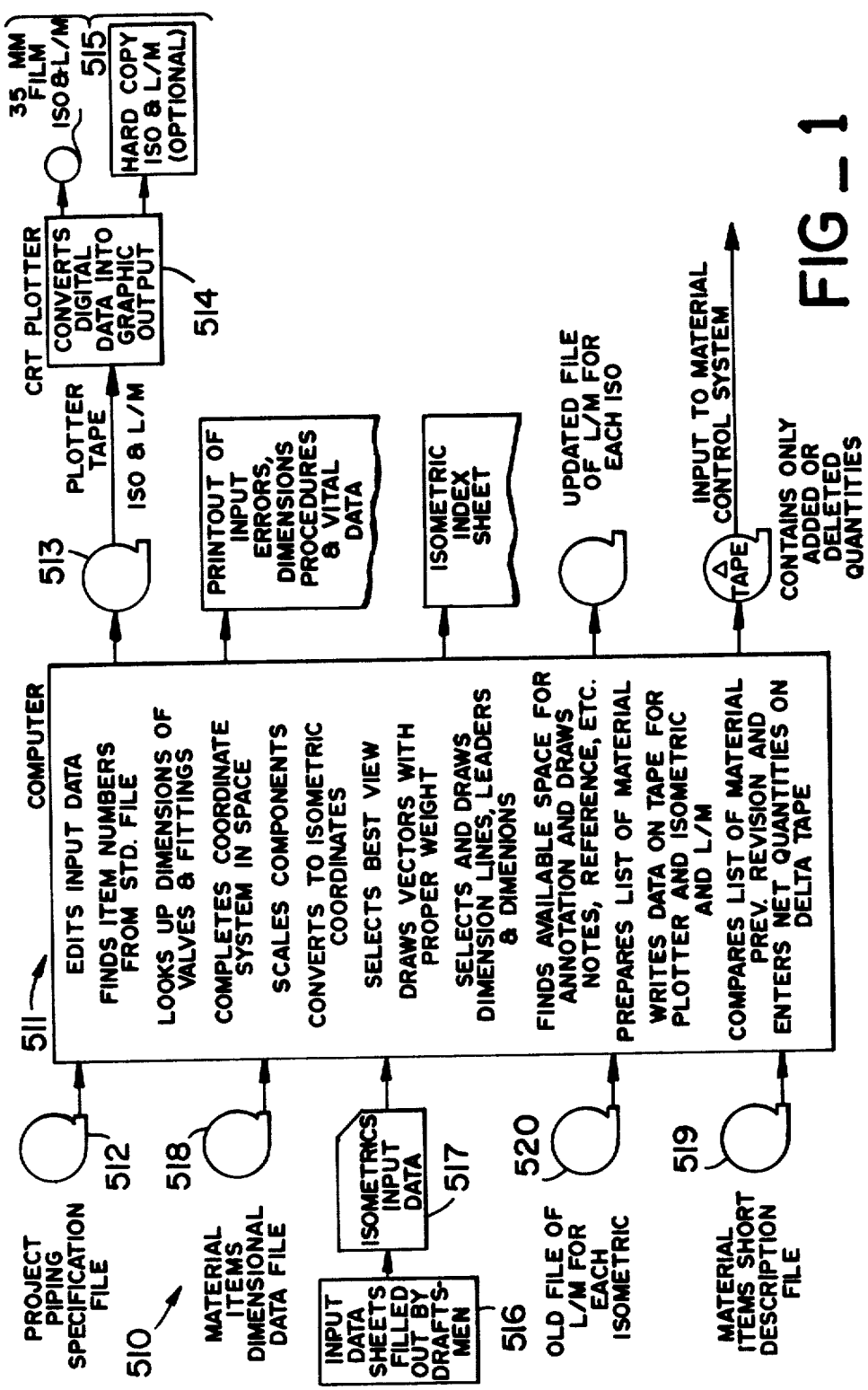
FIG. 1 is a schematic diagram illustrating operations of an isometric and materials listing system in which an off-line checking program method of the present invention is utilized.

Refer now to FIG. 1, illustrating a computer-aided graphics system 510 in operation. The depicted computer-aided graphics system 510 provides an easy-to-understand input and output coding system as described, op. cit., capable of being used by a competent piping draftsman. Suffice it to say, that system 510 includes a computer 511 (such as an IBM 7094 or IBM 360/65), properly programmed to act on data in a preselected manner. That is to say, computer 511 is typically a large general purpose computer such as an IBM 7094 or IBM 360/65 having a central processor, a large high-speed memory and an input-output device or devices controlled by a central controller. Through operation of the computer 511, control signals are generated for manipulating the input data including project piping specification file 512.

It should be recalled that the computer 511 can be programmed to control operations in several ways: by specifically authorizing certain operations; by calls for input or output functions; by alternating flows of controls so that groups of statements can then be executed repeatedly or the sequence otherwise changed; as well as the insertion of certain statements which provide information without requiring further computation. As changes in the data occur to accumulation of results within the computer the output device can be controlled to provide a magnetic tape 513 onto which have been read plotting signals for use in conjunction with a well-known CRT plotter 514 such as an SC-4060 CRT plotter to produce an isometric drawing 515.

In executing the program or programs in the computer memory, digital words—say a 32-bit word—are accessed from the memory and temporarily stored in the central processor. There, the operational code and arguments are interpreted and the appropriate action (such as add, shift, accumulate, load, store, control, print, etc.) is performed. As a result, sequence of data arrays is generated within the central processor and provide all information needed to display the three-dimensional pipeline as a planar representation at plotter 514. That is, a series of display command signals can be generated which can be recorded on the magnetic tape 513 for later loading into the plotter 514. The plotter 514 is a cathode ray device such as an SC-4020 or SC-4060 (Stromberg Datagraphics) or FR-80 (Information International). These devices convert the plotting tape data signals into lines and letters and record the information into microfilm at high speed. Two frames of information that make up each isometric drawing are completed every two seconds. The visual transfer to a complete engineering drawing is an enlargement on paper vellum of the two film frames. The left-hand frame, for example, portrays the actual isometric drawing with a list of materials, notes and references; and data and titles contained in the right-hand frame. The exact size of the drawing depends on a number of different factors including the make of the plotting device and the type of film, either 16 or 35 mm. film.

CODES

In reliance upon the analogy that control logic can be most appropriately illustrated from the input, output and intermediate data character, a detailed discussion of the data structure is set forth in FIG. 1, whereby overall cooperation of card and tape input data to the computer 511 is shown.

As shown, from user initiated data via data sheet 516, punched cards 517 can be provided. At processing time, the computer 511 can be loaded with associated inputs via magnetic tape, to wit: magnetic tape 518 related to dimensional data of the piping items; magnetic tape 519 related to a short description data file useful in providing easy-to-understand symbols for the final display, magnetic tape 520 utilized to input the "old" list of materials for each isometric so that as changes are made, the "new" list of materials can reflect these changes; and the magnetic tape 512 containing data fields related to piping items of the present invention as discussed above and below in detail. These data bases are placed in memory within the computer 511, then fetched and manipulated by the control processor as needed to provide the desired function.

Since the piping specification file 512 is for the exclusive use of the user, appropriate instructional notes to aid in the correct selection of piping items in view of service conditions of the piping system are optionally available. Upon presentation by the user-designer of the correct code, the required piping item of the specification file is specified in terms of the correct usage of the item within the pipeline system. Each piping specification file is unique for each project containing specific material selections and design instructions for the plans being designed, with the file being used by the computer to provide the intelligence for selection of appropriate piping items from a coded input by the designer. It also provides title information for the isometric drawing blocks, as well as provides information for branching reinforcement, change in directions (elbows, miters, and so forth), valve temperature limitations and groupings of materials for shop fabrication, or field erection.

Since each pipe specification file 512 is constantly being updated, a description of the method of creating such a file and cross-checking data is instructive.

Figure 2:
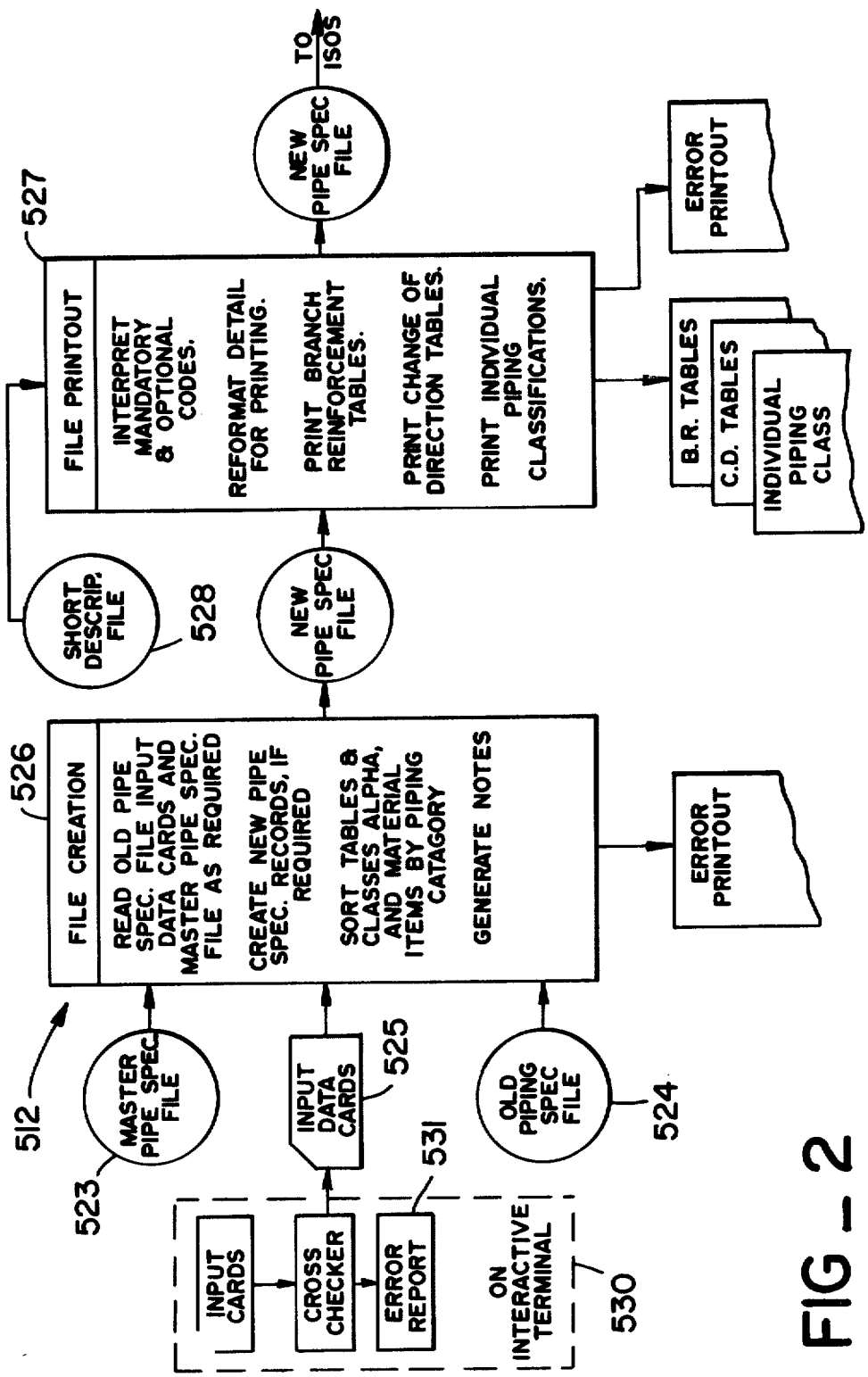
FIG. 2 is a block diagram illustrating updating of the pipe specification file of the system of FIG. 1 using the off-line program method of the present invention.

As shown in FIG. 2, a piping specification file 512 can be created from a number of sources. For example, a master piping specification file 523, say on magnetic tape, can be used. Similarly, an old piping specification file 524 can also be used, which is more up to date and more in line with the present project such as symbolized by magnetic tape input marked 524. Or, a complete input data card can be created as illustrated by card symbol 525. Within the computer, a file is created symbolized by block 526 in which various sort tables and decisional tables can be created by piping categories. Similarly, notes can be generated of a particular nature.

File printouts 527 are accomplished using a printer after the new piping specification file has been inputted thereto in parallel with a short description file 528.

Assume the information is being inputted only via input data cards generally indicated by 525; in order to cross-checking the cards 525 for errors, cross-check programmable method 530 of the present invention is utilized, off-line, whereby errors are indicated via error report 531.

FIG. 3 illustrates steps provided by the program method 530 of the present invention.

Briefly, the programmable method 530 is used off-line, in interactive form using a terminal connected to a remote computer rather in batch mode in conjunction with system computer 511 of FIG. 1. In that way, process utilization time can be maximized.

As shown in FIG. 3, afer declaration and utilization steps have occurred at 541, and 542, a card is read, at 543. At 544, different kinds of cards create use of two types of cross-check branches, branch 545 or 546, to determine whether or not the card is an "IE" card or if not, is a card of sufficient quality, respectively. If the card is an "IE" card, it is checked via branch 545 beginning at 548, field by field as a function of piping specification class, i.e., each card as a function of type of service, material, etc., as set forth in the above-identified co-pending application, is cross-checked against preselected sandards. If the field checks are satisfactory via step 549, the card is indicated as a proper operational card, at step 550. Iteration then occurs via loop 551. If the card is not an "IE" card, branch 546 is utilized in parallel manner.

The present invention has been successfully implemented and the program listing thereof is set forth below.

```
/* C4EDIT INTERACTIVE VERSION************* */
C4EDIT: PROC OPTIONS (MAIN) REORDER;
/* ******************************************* */

/* ----------------------------------------- */
/*

*/

/*    THIS IS THE INTERACTIVE VERSION OF THE PROGRAM
      "C4EDIT".  IT WILL EDIT THE INPUT DATA FOR THE
      CAPIM4 PIPE SPEC FILE AND OUTPUT AN ERROR
      REPORT ON THE TERMINAL.  IT WILL ALSO PRODUCE
      AN OUTPUT FILE CONSISTING OF THE CARDS THAT
      PASSED THE DATA CHECKS.                  */
/* ----------------------------------------- */

%PAGE;
      DCL INREC  FILE RECORD INPUT  ENV(F RECSIZE(80) TOTAL);
      DCL OUTREC FILE RECORD OUTPUT ENV(F RECSIZE(80) TOTAL);
      DCL EOF              BIT(1)   INIT('0'B);
      DCL ER_SW            PIC'9'   INIT('0');
      DCL WR_SW            PIC'9'   INIT('0');
      DCL WFLD             CHAR(2)  INIT(' ');
      DCL H_AREA           PIC'9999' INIT('0');
```

```
DCL M_AREA              PIC'9999'  INIT('0');
DCL T_AREA              PIC'99'    INIT('0');
DCL W_AREA              FIXED DECIMAL (7,3)  INIT('0');
DCL V_AREA              FIXED DECIMAL (7,3)  INIT('0');
DCL MSG                 CHAR(50)   INIT(' ');

DCL ADDR                BUILTIN;
DCL SUBSTR              BUILTIN;
DCL VERIFY              BUILTIN;

DCL CNTR                PIC'999'   INIT('0');
DCL E_CNTR              PIC'999'   INIT('0');
DCL R_CNTR              PIC'999'   INIT('0');
DCL NUM                 CHAR(10)   INIT('0123456789');
DCL LINE_CNT            PIC'99'    INIT('65');
DCL TENS                CHAR(80)   INIT('         1         2         3         4         5         6         7         8');
DCL ONES                CHAR(80)   INIT('12345678901234567890123456789012345678901234567890123456789012345678901234567890');

%PAGE;
DCL 1 BUFFER,
    2 CC1               CHAR(1),
    2 CC2_3             PIC'99',
    2 CC4_9             CHAR(6),
    2 CC10_13           CHAR(4),
    2 CC14_17           CHAR(4),
    2 CC18_21           CHAR(4),
    2 CC22              CHAR(1),
    2 CC23_24           CHAR(2),
    2 CC25              CHAR(1),
    2 CC26_27           CHAR(2),
    2 CC28              CHAR(1),
    2 CC29              PIC'9',
    2 CC30              CHAR(1),
    2 CC31_34           CHAR(4),
    2 CC35              CHAR(1),
    2 CC36              CHAR(1),
    2 CC37_38           CHAR(2),
    2 CC39_44           CHAR(6),
    2 CC45_48           CHAR(4),
    2 CC49_52           CHAR(4),
    2 CC53              CHAR(1),
    2 CC54_56           CHAR(3),
    2 CC57              CHAR(1),
    2 CC58_59           CHAR(2),
    2 CC60              CHAR(1),
    2 CC61_62           CHAR(2),
    2 CC63              CHAR(1),
    2 CC64              PIC'9',
    2 CC65              CHAR(1),
    2 CC66_69           CHAR(4),
    2 CC70_78           CHAR(9),
    2 CC79_80,
      4 CC79            CHAR(1),
      4 CC80            CHAR(1);
DCL R_BUFFER            CHAR(80)   BASED(ADDR(BUFFER));
%PAGE;
DCL 1 BUFF_2,
    2 CCB1_2            CHAR(2),
    2 CCB3_6            PIC'9999',
    2 CCB7_8            CHAR(2),
    2 CCB9              CHAR(1),
    2 CCB10             CHAR(1),
    2 CCB11_14          CHAR(4),
    2 CCB15_19          CHAR(5),
```

```
            2 CCB20          CHAR(1),
            2 CCB21_29       CHAR(9),
            2 CCB30          CHAR(1),
            2 CCB31_37       CHAR(7),
            2 CCB38          PIC'9',
            2 CCB39_40       CHAR(2),
            2 CCB41          CHAR(1),
            2 CCB42_63       CHAR(22),
            2 CCB64_71       CHAR(8),
            2 CCB72_78       CHAR(7),
            2 CCB79_80       CHAR(2);

DCL T_BUFFER          CHAR(80)   BASED(ADDR(BUFF_2));
   %PAGE;
MAIN_LINE:
   OPEN FILE (INREC), FILE (OUTREC);
   ON ENDFILE (INREC) BEGIN;
      EOF = '1'B;
   END;

ON CONVERSION BEGIN;
     MSG = 'INVALID CHARACTER IN CARD';
     CALL ERROR;
     END;

T_BUFFER = ' ';
   R_BUFFER = ' ';
   READ FILE (INREC) INTO (BUFFER);
   DO WHILE (EOF = '0'B);
   CNTR = CNTR + 1;
   CALL WR_TITLE;
   T_BUFFER = R_BUFFER;
   IF CCB79_80 = '1E'
   THEN DO;
      CALL EDIT_1E;
      CALL BUILD_FILE;
      END;
   ELSE
      IF CC79 = '2' & CC80 = 'E' |
         CC79 = '3' & CC80 = 'E'
        THEN CALL BUILD_FILE;
        ELSE
           SELECT (CC80);
              WHEN ('A','B','C','D','F','Q','R','S') DO;
                CALL BUILD_FILE;
              END;
              OTHERWISE DO;
                CALL EDIT_REST;
                CALL BUILD_FILE;
              END;
           END;
   READ FILE (INREC) INTO (BUFFER);
   ER_SW = 0;
   END;
   %PAGE;
EDIT_1E: PROC;
/*                    DATA CHECKS FOR ALL "1E" CARDS */
   WR_SW = 0;
   ER_SW = 0;
   E_CNTR = E_CNTR + 1;
   IF VERIFY (CCB3_6,NUM) = 0
     THEN;
     ELSE DO;
        MSG = 'CC 3-6 MUST BE AN INTEGER';
        CALL ERROR;
        END;
```

```
IF CCB9 = ' ' | CCB9 = '1'
   THEN;
   ELSE DO;
      MSG = 'CC 9 MUST CONTAIN "1" OR BLANKS';
      CALL ERROR;
      END;

IF CCB11_14 = ' '
   THEN;
   ELSE DO;
      M_AREA = CCB11_14;
      H_AREA = CCB11_14;
      IF M_AREA > 0
         THEN;
         ELSE DO;
            MSG = 'CC 11-14 MUST BE AN INTEGER';
            CALL ERROR;
            END;
      END;

IF E_CNTR > 1
   THEN DO;
      IF CCB11_14 = ' '
         THEN;
         ELSE DO;
            IF CCB11_14 = H_AREA
               THEN;
               ELSE DO;
                  MSG = 'ALL 1E CARDS DO NOT HAVE SAME NUMBER IN CC 11-14';
                  CALL ERROR;
                  END;
            END;
      END;

IF CCB20 = ' ' | CCB20 = '1'
   THEN;
   ELSE DO;
      MSG = 'CC 20 MUST CONTAIN "1" OR BLANKS';
      CALL ERROR;
      END;

IF CCB30 ¬= ' '
   THEN;
   ELSE DO;
      MSG = 'CC 30 MUST NOT BE BLANK';
      CALL ERROR;
      END;

IF CCB38 = 1 | CCB38 = 2
   THEN;
   ELSE DO;
   MSG = 'CC 38 MUST CONTAIN "1" OR "2"';
   CALL ERROR;
   END;

IF CCB20 = '1' & CCB41 = ' '
   THEN DO;
      MSG = 'CC 41 OR CC 20 INVALID';
      CALL ERROR;
      END;
   ELSE;

IF SUBSTR(CCB64_71,1,2) > 0 &
   SUBSTR(CCB64_71,4,2) > 0 &
   SUBSTR(CCB64_71,7,2) > 0
   THEN;
```

```
      ELSE DO;
         MSG = 'CC 64-71 NOT A VALID DATE';
         CALL ERROR;
         END;
END;
  %PAGE;
EDIT_REST: PROC;
/*                  DATA CHECKS FOR ALL OTHER CARDS */
   ER_SW = 0;
   WR_SW = 0;
   IF CC1 = 'J'  | CC1 = 'L'  |
      CC1 = 'S'  | CC1 = ' '
     THEN;
     ELSE DO;
        MSG = 'CC 1 MUST CONTAIN "J", "L" OR "S"';
        CALL ERROR;
        END;

IF VERIFY (CC2_3,NUM) = 0
     THEN;
     ELSE DO;
         MSG = 'CC 2-3 MUST BE AN INTEGER < 90';
         CALL ERROR;
         END;

IF CC4_9 ¬= 'I'  | CC4_9 ¬= 'O'
     THEN;
     ELSE DO;
         MSG = 'CC 4-9 MUST NOT CONTAIN "I" OR "O"';
         CALL ERROR;
         END;

IF CC10_13 = '  '
     THEN CC10_13 = '0';
     ELSE;
   IF CC14_17 = '  '
     THEN CC14_17 = '0';
     ELSE;
   W_AREA = CC10_13;
   V_AREA = CC14_17;
   IF W_AREA >= .5 & W_AREA <= 24 & W_AREA <= V_AREA
     THEN;
     ELSE DO;
         MSG = 'CC 10-13 MUST BE > OR = .5 AND < OR = 24.';
         CALL ERROR;
         END;

IF V_AREA >= .5 & V_AREA <= 24
     THEN;
     ELSE DO;
         MSG = 'CC 14-17 MUST BE > OR = .5 AND < OR = 24.';
         CALL ERROR;
         END;

IF CC18_21 = '  '
     THEN;
     ELSE DO;
        W_AREA = CC18_21;
        IF W_AREA > 0 & W_AREA < 999
          THEN;
          ELSE DO;
                MSG = 'CC 18-21 MUST BE BLANK OR > 0 AND < 999';
                CALL ERROR;
                END;
          END;
```

```
IF CC23_24 = ' '
  THEN;
  ELSE DO;
    W_AREA = CC23_24;
    IF W_AREA > 0 & W_AREA < 99
      THEN;
      ELSE DO;
         MSG = 'CC 23-24 MUST BE BLANK OR > 0 AND < 99';
         CALL ERROR;
         END;
    END;

IF CC26_27 = ' '
  THEN;
  ELSE DO;
    W_AREA = CC26_27;
    IF W_AREA > 0 & W_AREA < 99
      THEN;
      ELSE DO;
         MSG = 'CC 26-27 MUST BE BLANK OR > 0 AND < 99';
         CALL ERROR;
         END;
    END;

IF CC29 > 0 & CC29 < 4
  THEN;
  ELSE DO;
     MSG = 'CC 29 MUST BE > 0 AND < 4';
     CALL ERROR;
     END;

IF CC31_34 = ' '
THEN;
ELSE DO;
    WFLD = CC2_3;
    IF CC1 = 'L' & SUBSTR(WFLD,1,1) = '2' &
       CC31_34 > 0 & CC31_34 < 9999 |
       CC31_34 > 0
      THEN;
      ELSE DO;
         MSG = 'CC 31-34 MUST BE BLANK OR > 0 AND < 9999';
         CALL ERROR;
         END;
    END;

IF CC36 = 'J' | CC36 = 'L' |
   CC36 = 'S' | CC36 = ' '
  THEN;
  ELSE DO;
     MSG = 'CC 36 MUST CONTAIN "J", "L" OR "S"';
     CALL ERROR;
     END;

IF CC37_38 = ' '
  THEN;
  ELSE DO;
    T_AREA = CC37_38;
    IF VERIFY (T_AREA,NUM) = 0
      THEN;
      ELSE DO;
         MSG = 'CC 37-38 MUST BE < 90';
         CALL ERROR;
         END;
    END;

IF CC39_44 ¬= 'I' | CC39_44 ¬= 'O'
```

```
          THEN;
          ELSE DO;
             MSG = 'CC 39-44 MUST NOT CONTAIN "I" OR "O"';
             CALL ERROR;
             END;

IF CC45_48 = ' '
      THEN;
      ELSE DO;
         IF CC49_52 = ' '
            THEN;
            ELSE DO;
               W_AREA = CC45_48;
               V_AREA = CC49_52;
               IF W_AREA >= .5 & W_AREA <= 24 &
                  W_AREA <= V_AREA
                  THEN;
                  ELSE DO;
                     MSG = 'CC 45-48 MUST BE > OR = .5 AND < OR = 24.';
                     END;
            END;
      END;

IF CC49_52 = ' '
      THEN;
      ELSE DO;
         IF V_AREA >= .5 & V_AREA <= 24
            THEN;
            ELSE DO;
               MSG = 'CC 49-52 MUST BE > OR = .5 AND < OR = 24.';
               CALL ERROR;
               END;

IF CC54_56 = ' '
      THEN;
      ELSE DO;
         W_AREA = CC54_56;
         IF W_AREA > 0 & W_AREA < 999
            THEN;
            ELSE DO;
               MSG = 'CC 54-56 MUST BE BLANK OR > 0 AND < 999';
               CALL ERROR;
               END;
         END;

IF CC58_59 = ' '
      THEN;
      ELSE DO;
         W_AREA = CC58_59;
         IF W_AREA > 0 & W_AREA < 99
            THEN;
            ELSE DO;
               MSG = 'CC 58-59 MUST BE BLANK OR > 0 AND < 99';
               CALL ERROR;
               END;
         END;

IF CC61_62 = ' '
      THEN;
      ELSE DO;
         W_AREA = CC61_62;
         IF W_AREA > 0 & W_AREA < 99
            THEN;
            ELSE DO;
               MSG = 'CC 61-62 MUST BE BLANK OR > 0 AND < 99';
               CALL ERROR;
               END;
         END;
```

```
   IF CC64 > 0 & CC64 < 4
     THEN;
     ELSE DO;
         MSG = 'CC 64 MUST BE > 0 AND < 4';
         CALL ERROR;
         END;

IF CC66_69 = ' '
   THEN;
   ELSE DO;
       WFLD = CC37_38;
       IF CC36 = 'L' & SUBSTR(WFLD,1,1) = '2' &
          CC66_69 > 0 & CC66_69 < 9999 |
          CC66_69 > 0
         THEN;
         ELSE DO;
             MSG = 'CC 66-69 MUST BE BLANK OR > 0 AND < 9999';
             CALL ERROR;
             END;
       END;

END EDIT_REST;
   %PAGE;
ERROR: PROC;
/*    ERROR ROUTINE - PRINTS ERROR REPORT            */
   ER_SW = 1;
   IF WR_SW = 1
     THEN;
     ELSE DO;
        PUT SKIP(2);
        PUT EDIT(R_BUFFER) (COL(1),A);
        PUT EDIT('ERRORS IN CLASS ',SUBSTR(R_BUFFER,78,3))
           (COL(20),A,A);
        LINE_CNT = LINE_CNT + 4;
        R_CNTR = R_CNTR + 1;
        WR_SW = 1;
        END;
     PUT SKIP(1);
     PUT EDIT(MSG) (COL(20),A);
     LINE_CNT = LINE_CNT + 2;
END ERROR;

%SKIP(3);
WR_TITLE: PROC;
   IF LINE_CNT >= 56 & LINE_CNT <= 59
     THEN DO;
        PUT SKIP(2) EDIT(TENS) (COL(1),A);
        PUT SKIP EDIT(ONES) (COL(1),A);
        LINE_CNT = LINE_CNT + 5;
        END;
   ELSE;
   IF LINE_CNT > 60
     THEN DO;
        PUT PAGE EDIT('CAPIM SPEC FILE ERROR REPORT')
                  (SKIP(1),COL(25),A);
        PUT SKIP(4);
        PUT EDIT(TENS) (COL(1),A);
        PUT SKIP EDIT(ONES) (COL(1),A);
        LINE_CNT = 0;
        END;
     ELSE;
END WR_TITLE;
   %PAGE;
BUILD_FILE: PROC;
/*    BUILDS OUTPUT FILE FROM GOOD DATA              */
   IF ER_SW = 0
```

```
      THEN DO;
        LINE_CNT = LINE_CNT + 3;
        PUT SKIP(2) EDIT ('CLASS ',SUBSTR(R_BUFFER,78,3),'  NO ERRORS')
           (COL(20),A,A,A);
        WRITE FILE (OUTREC) FROM (BUFFER);
        END;
      ELSE;
END BUILD_FILE;

PUT SKIP(2);
  PUT EDIT(TENS) (COL(1),A);
  PUT SKIP EDIT(ONES) (COL(1),A);
  PUT SKIP(3);
  IF R_CNTR = 0
     THEN PUT SKIP EDIT ('NO ERRORS FOUND IN INPUT DATA') (COL(1),A);
     ELSE PUT SKIP EDIT (R_CNTR,' CARDS IN ERROR') (COL(1),A,A);
  PUT SKIP EDIT(CNTR,' INPUT RECORDS PROCESSED') (COL(1),A,A);
  CLOSE FILE (INREC), FILE (OUTREC);
END C4EDIT;
```

While an embodiment and listing have been set forth in detail, variations are readily apparent to those skilled in the art, and the invention is to be given its broadest interpretation within the purview of the following claims.

What is claimed is:

1. An off-line method for aiding updating of a graphical system for producing in a plane having two-dimensional pipeline coordinate axes, a planar, axonometric representation of a three-dimensional pipeline in which material and non-material aspects of piping elements of said pipeline are associated with a multibit digital code representative of a series of workpoints compatible for use within a digital computer system, said workpoints being paired into overlapping sets, each set containing dominant and subservient points having known coordinates with respect to intersecting axes X, Y and Z, and being identified in relative three-dimensional coordinates by a distance (d) between points and values of angles of a straight line intersecting them as related to orthogonal planes of reference, comprising:

(A) by means of said digital computer system, storing and sorting pipe specification information about said pipeline both as (i) machine readable data words or portions of words, and (ii) as a function of field locations within a preselected data format for operation within said system;

(B) by means of said digital computer system, inputting off-line updated pipe specification data in said format on an iterative basis;

(C) by means of said digital computer system, comparing said updated pipe specification data with said stored and sorted pipe specification data; and (D) by means of said digital computer system, indicating correctness of said compared data whereby errors associated with said updated pipe specification data, can be determined and then corrected, off-line.

2. Method of claim 1 in which said step (C) includes cross-checking said updated pipe specification data to said stored and sorted pipe specification data by means of said digital computer system, in accordance with field location and structure content indexing codes.

3. Method of claim 2 in which said indexing codes are fields containing alphanumeric data bits in preselected row-column arrays.

4. Method of claim 1 in which step (D) includes activating a printer of said digital computer system so as to indicate—in message form—errors in said updated pipe specification data.

* * * * *